(12) United States Patent
Cagliero et al.

(10) Patent No.: US 12,269,316 B2
(45) Date of Patent: Apr. 8, 2025

(54) SYSTEM FOR CONTROLLING THE TEMPERATURE OF A BATTERY IN A VEHICLE

(71) Applicant: DENSO THERMAL SYSTEMS S.P.A., Poirino (IT)

(72) Inventors: Stefano Cagliero, Poirino (IT); Pasquale Napoli, Poirino (IT)

(73) Assignee: DENSO THERMAL SYSTEMS S.P.A., Poirino (IT)

( * ) Notice: Subject to any disclaimer, the term of this patent is extended or adjusted under 35 U.S.C. 154(b) by 237 days.

(21) Appl. No.: 17/639,829

(22) PCT Filed: Sep. 1, 2020

(86) PCT No.: PCT/IB2020/058116
§ 371 (c)(1),
(2) Date: Mar. 2, 2022

(87) PCT Pub. No.: WO2021/044288
PCT Pub. Date: Mar. 11, 2021

(65) Prior Publication Data
US 2022/0324292 A1    Oct. 13, 2022

(30) Foreign Application Priority Data
Sep. 2, 2019    (IT) .......................... 102019000015372

(51) Int. Cl.
*B60H 1/00*    (2006.01)
*B60L 58/26*    (2019.01)
(Continued)

(52) U.S. Cl.
CPC ..... *B60H 1/00899* (2013.01); *B60H 1/00278* (2013.01); *B60L 58/26* (2019.02);
(Continued)

(58) Field of Classification Search
CPC .......... B60H 1/00899; B60H 1/00278; H01M 10/613; H01M 10/615; H01M 10/625;
(Continued)

(56) References Cited

U.S. PATENT DOCUMENTS 7,975,757 B2 *   7/2011   Nemesh ............ H01M 10/6568
                                                        165/42
10,688,847 B2 *  6/2020   Kim .................... B60H 1/00278
(Continued)

FOREIGN PATENT DOCUMENTS

JP    2002-352867 A    12/2002
JP    2015-140093 A    8/2015

OTHER PUBLICATIONS

Chowdhury et al., "Total Thermal Management of Battery Electric Vehicles (BEVs)", SAE Technical Paper Series, vol. 1: 1-7 (2018).
(Continued)

*Primary Examiner* — Raheena R Malik
(74) *Attorney, Agent, or Firm* — Merchant & Gould P.C.

(57) ABSTRACT

A system includes an electric battery. A thermal regulation circuit has liquid pass through the circuit and includes an operative tract in thermal exchange relation with the battery to control battery temperature. A refrigeration circuit has fluid pass through that is subjected to a non-reversible refrigeration cycle. The refrigeration circuit includes a condenser in thermal exchange relation with the thermal regulation circuit heating tract. An evaporator is in thermal exchange relation with the cooling tract of the thermal regulation circuit. A thermal regulation circuit valve assembly is selectively configured in a heating configuration and in a cooling configuration. The valve assembly defines, in the thermal regulation circuit between the operative tract and the cooling tract, a closed heating path for the liquid in the
(Continued)

heating configuration, and a closed cooling path for the liquid in the cooling configuration.

17 Claims, 3 Drawing Sheets

(51) Int. Cl.
*B60L 58/27* (2019.01)
*H01M 10/613* (2014.01)
*H01M 10/615* (2014.01)
*H01M 10/625* (2014.01)
*H01M 10/6568* (2014.01)
*H01M 10/663* (2014.01)

(52) U.S. Cl.
CPC ........... *B60L 58/27* (2019.02); *H01M 10/613* (2015.04); *H01M 10/615* (2015.04); *H01M 10/625* (2015.04); *H01M 10/6568* (2015.04); *H01M 10/663* (2015.04); *B60L 2240/545* (2013.01); *H01M 2220/20* (2013.01)

(58) Field of Classification Search
CPC ........... H01M 10/6568; H01M 10/663; H01M 2220/20; B60L 58/27; B60L 58/26; B60L 2240/545
See application file for complete search history.

(56) References Cited

U.S. PATENT DOCUMENTS

| | | | |
|---|---|---|---|
| 11,407,273 B2 * | 8/2022 | Kim | B60H 1/00321 |
| 2017/0106725 A1 | 4/2017 | Kim et al. | |
| 2018/0111443 A1 * | 4/2018 | Kim | B60H 1/00278 |
| 2018/0117984 A1 * | 5/2018 | Kim | B60L 58/26 |
| 2018/0117990 A1 * | 5/2018 | Kim | B60H 1/32284 |
| 2018/0208014 A1 * | 7/2018 | Ben Ahmed | B60H 1/3211 |
| 2018/0208061 A1 * | 7/2018 | Ben Ahmed | B60H 1/00899 |
| 2019/0047369 A1 * | 2/2019 | Kim | F25B 21/04 |
| 2019/0176572 A1 * | 6/2019 | Kim | B60H 1/00428 |
| 2020/0070619 A1 * | 3/2020 | Kim | B60H 1/00899 |
| 2023/0173883 A1 * | 6/2023 | Jeong | B60H 1/00278 62/159 |
| 2023/0182534 A1 * | 6/2023 | Kim | H01M 10/6569 62/239 |

OTHER PUBLICATIONS

International Search Report and Written Opinion for PCT/IB2020/058116 (Nov. 3, 2020).

Office Action for Japanese Patent Application No. 2022-512856 (Feb. 6, 2024).

* cited by examiner

SYSTEM FOR CONTROLLING THE TEMPERATURE OF A BATTERY IN A VEHICLE

This application is a National Stage Application of International Application No. PCT/IB2020/058116, filed Sep. 1, 2020, which claims benefit of Serial No. 102019000015372, filed Sep. 2, 2019, in Italy and which applications are incorporated herein by reference. To the extent appropriate, a claim of priority is made to each of the above-disclosed applications.

TECHNICAL FIELD

The present invention relates to a system for controlling the temperature of a battery in a vehicle.

BACKGROUND ART

It is generally known that vehicles are equipped with batteries supplying electric power to devices and apparatuses installed in such vehicles. In particular, in some modern applications power is also supplied in order to at least partly propel the vehicle, e.g. on electric or "hybrid" vehicles.

In order to ensure the proper operation and a long life of the battery of a vehicle, it is desirable to keep the battery temperature within a given operating range. For example, excessively high operating temperatures may significantly reduce the number of recharging cycles that the battery can be subjected to. Vice versa, excessively low temperatures may reduce the battery performance.

Battery temperature is normally regulated by means of a hydraulic circuit in which a liquid, in particular water, is used in order to effect a thermal exchange with the battery for heating and, respectively, cooling it. The liquid is cooled and, respectively, heated by a reversible thermodynamic circuit in thermal exchange with the hydraulic circuit. The reversible thermodynamic circuit is configured for acting as a refrigerating machine and, respectively, as a heat pump, depending on the thermal interaction that needs to be effected between the battery and the thermal regulation circuit.

However, such measures, which employ a reversible thermodynamic circuit, require the use of costly and complex components and do not allow for simultaneous optimization of the operation of the refrigeration and heat pump cycles.

SUMMARY OF THE INVENTION

It is one object of the present invention to provide a system for controlling the temperature of a battery in a vehicle, wherein such system can solve the problems suffered by the prior art and can be manufactured in a simple and economical manner.

According to the present invention, this and other objects are achieved through a system having the technical features set out in the appended independent claim.

In particular, due to the fact that there is a refrigeration circuit configured for being run through by a fluid that can be subjected to a refrigeration cycle in a non-reversible manner, thermal exchange optimization is possible in this system without using any complex and costly components.

It is understood that the appended claims are an integral part of the technical teachings provided in the following detailed description of the present invention. In particular, the appended dependent claims define some preferred embodiments of the present invention that include some optional technical features.

Further features and advantages of the present invention will become apparent in light of the following detailed description, provided merely as a non-limiting example and referring, in particular, to the annexed drawings as summarized below.

DETAILED DESCRIPTION OF THE INVENTION

Figure 1:
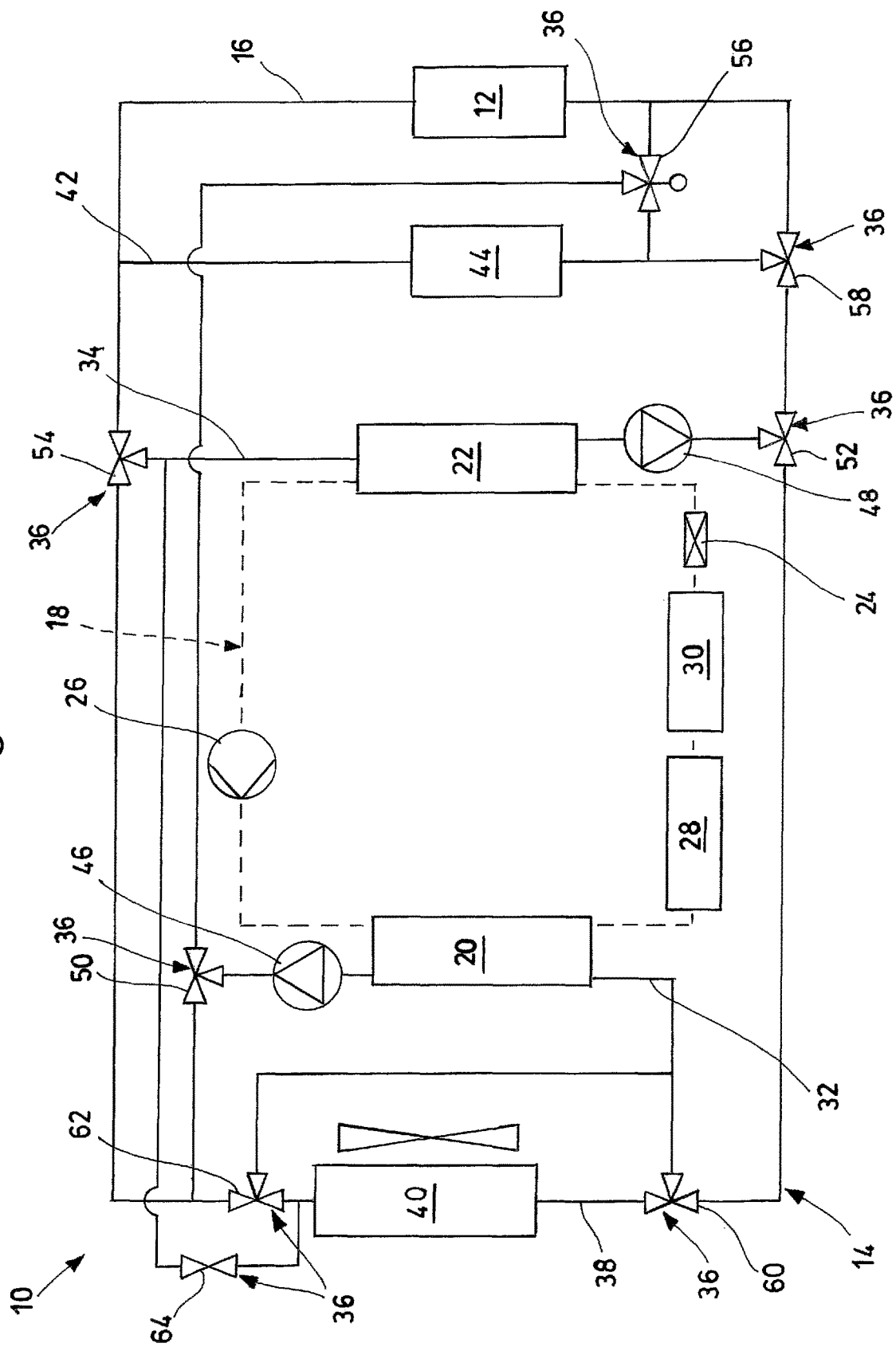
FIG. 1 is a functional block diagram representing a system for controlling the temperature of a battery in a vehicle made in accordance with an exemplary embodiment of the present invention.

With reference to the annexed drawings, reference numeral 10 designates as a whole a system for controlling the temperature of a battery in a vehicle.

As will be apparent to a person skilled in the art, system 10 may be configured for use in a motor vehicle of any category and type. For example, said motor vehicle may be a motorcar for transporting people or goods, a commercial vehicle, an industrial vehicle, a military vehicle, a building-site vehicle, a sports car, a sport utility vehicle (SUV), an agricultural machine, a train, a bus, etc. Such vehicle may be propelled by means of an internal combustion engine, an electric motor or a "hybrid" propulsion system.

System 10 comprises a battery 12 (or a plurality of batteries) configured for outputting electric power, the temperature of which needs to be controlled, in particular increased or decreased, according to the operating conditions.

As will be apparent to a person skilled in the art, battery 12 may be any type of battery wherein it is necessary, or desirable, to control the temperature. In particular, battery 12 is configured for supplying electric power to the vehicle on which system 10 is installed. For example, the electric power that the battery can supply may be at least partly used for propelling the vehicle on which the system is installed.

System 10 further comprises a thermal regulation circuit 14, shown in the drawings by means of a continuous line. Thermal regulation circuit 14 is configured for being run through by any liquid, e.g. water, suitable for thermally interacting with battery 12, in particular for heating and, respectively, cooling it depending on the operating condition of system 10.

As will be described more in detail below, thermal regulation circuit 14 comprises a plurality of ducts or branches configured to be put in selective communication with one another, so as to define a plurality of paths for the liquid flowing therethrough.

Thermal regulation circuit 14 comprises an operative tract 16 in thermal exchange relation with battery 12, so as to control the temperature thereof. In this manner, the liquid flowing through operative tract 16 can thermally interact with battery 12. In particular, the liquid flowing through operative tract 16 can yield heat to battery 12 and, respectively, receive heat from battery 12, depending on the temperature of the liquid compared with that of battery 12.

System 10 further comprises a refrigeration circuit 18, shown in the drawings by means of a dashed line. Refrigeration circuit 18 is configured for being run through by a fluid that can be subjected to a refrigeration cycle in a non-reversible manner and co-operates with thermal regulation circuit 14, as will be described more in detail below.

Refrigeration circuit 18 comprises a condenser 20 and an evaporator 22. In the embodiment illustrated herein by way of example, refrigeration circuit 18 comprises an expansion or lamination valve 24 connected downstream of condenser 20 and upstream of evaporator 22, and a compressor connected downstream of evaporator 22 and upstream of condenser 20.

Preferably, refrigeration circuit 18 further comprises an accumulator 28 connected downstream of the condenser and upstream of the expansion or lamination valve 24. In addition, in the exemplary embodiment illustrated herein the refrigeration circuit comprises a dryer 30 connected downstream of condenser 20 (in particular, in a position situated downstream of accumulator 28) and upstream of expansion or lamination valve 24.

Condenser 20 is in thermal exchange relation with a heating tract 32 of thermal regulation circuit 14, whereas evaporator 22 is in thermal exchange relation with a cooling tract 34 of thermal regulation circuit 14.

System 10 comprises a valve assembly 36 associated with thermal regulation circuit 14. Valve assembly 36 is configured to act upon thermal regulation circuit 14 by selectively taking a heating configuration and a cooling configuration, in particular with reference to the thermal exchange occurring with battery 12. For example, the operation of valve assembly 36—and, in particular, the switching between the heating configuration and the cooling configuration—can be controlled by a control device or module (not shown) included in system 10 in accordance with predetermined or operator-defined criteria.

Figure 2:
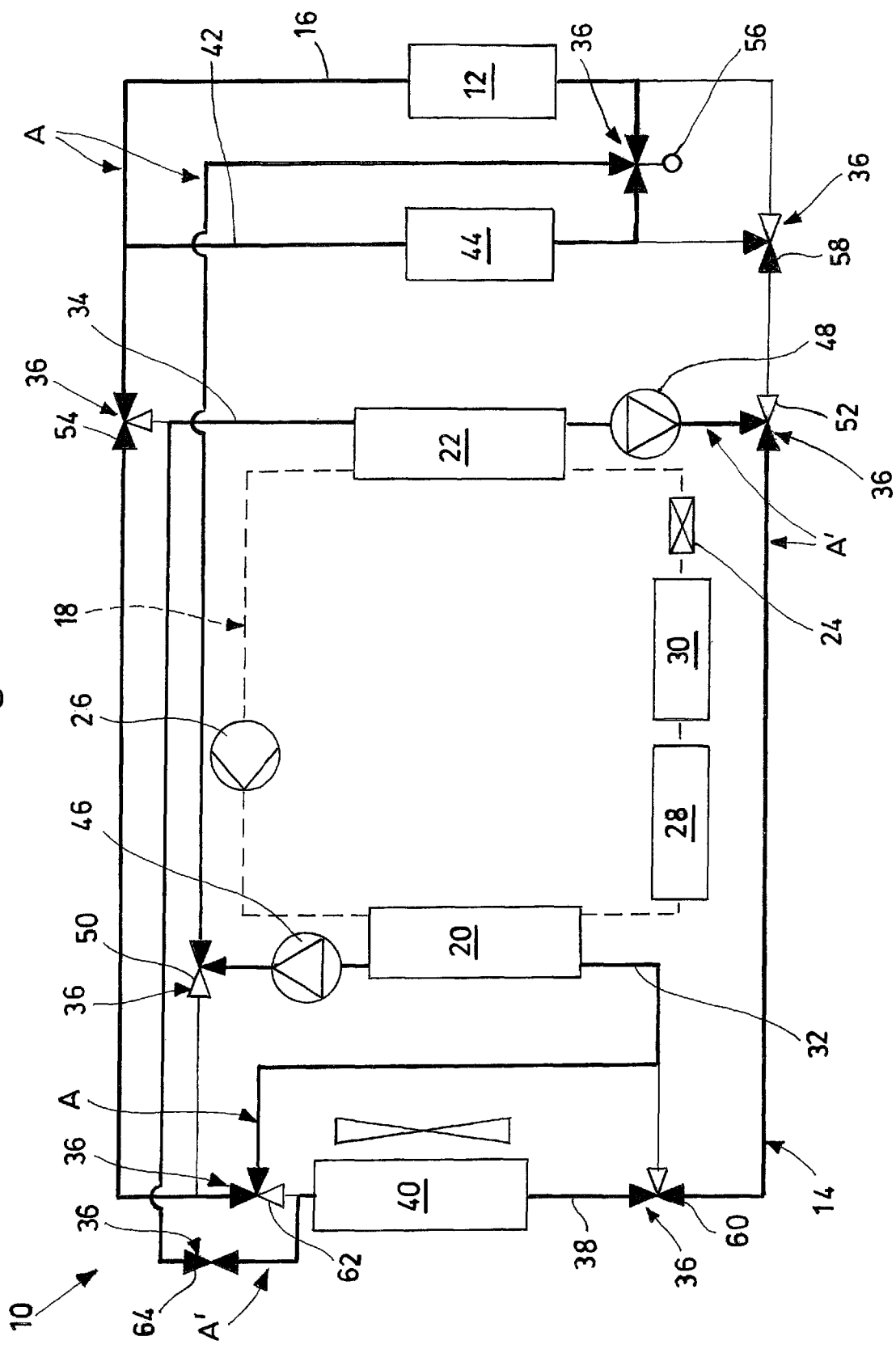
FIGS. 2 and 3 are block diagrams similar to the one shown in FIG. 1, wherein such system is depicted in a heating configuration and, respectively, in a cooling configuration.

In FIG. 2 system 10 is shown with valve assembly 36 in the heating configuration. In the heating configuration, valve assembly 36 defines in thermal regulation circuit 14 a closed heating path for the liquid between operative tract 16 and heating tract 32. The closed heating path, indicated by black arrows designated as A in FIG. 2, is drawn with a bolder line in comparison with the rest of thermal regulation circuit 14.

Figure 3:
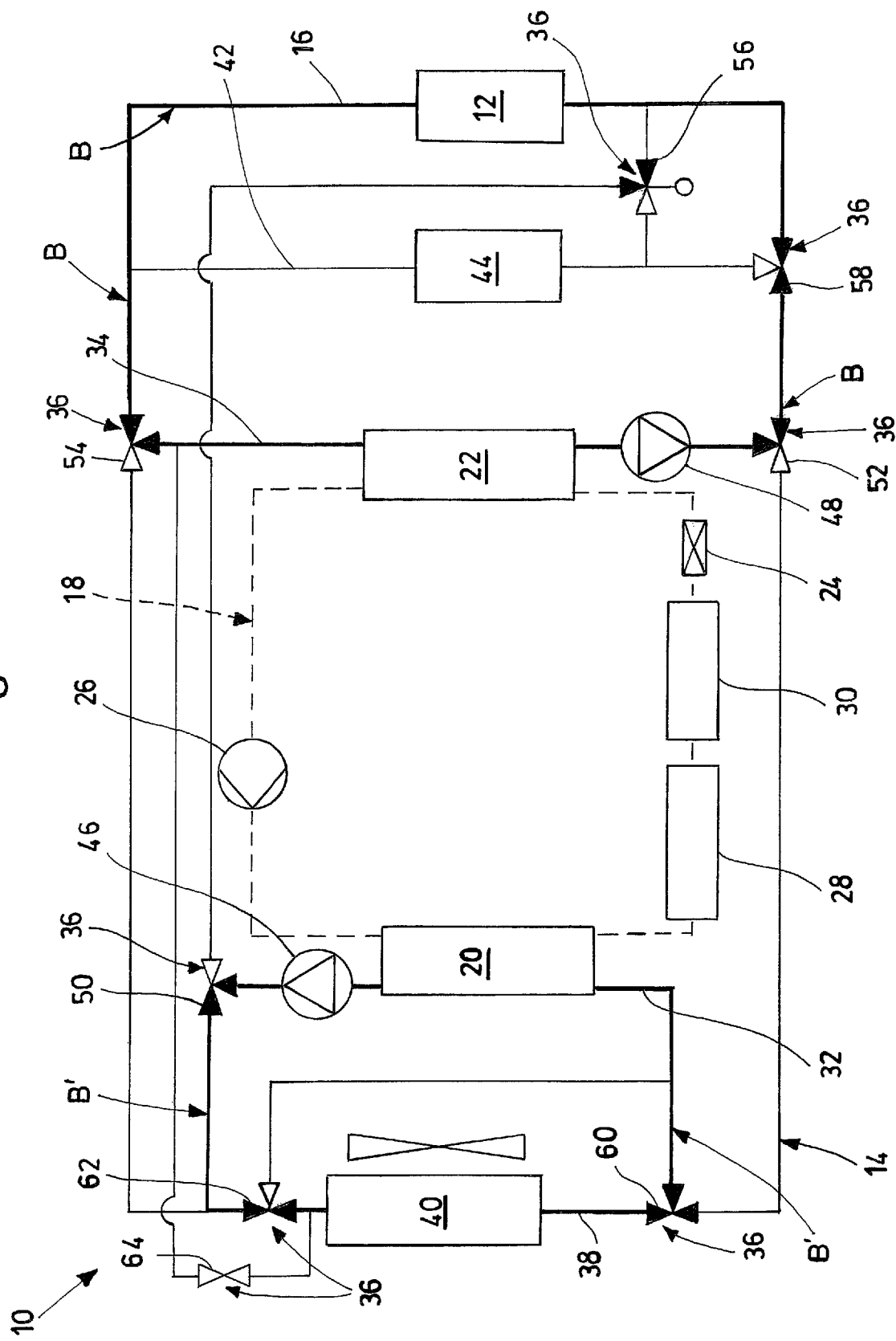

In FIG. 3 system 10 is shown with valve assembly 36 in the cooling configuration. In the cooling configuration, valve assembly 36 defines in thermal regulation circuit 14 a closed cooling path for the liquid between operative tract 16 and cooling tract 34. The closed cooling path, indicated by black arrows designated as B in FIG. 3, is drawn with a bolder line in comparison with the rest of thermal regulation circuit 14.

Typically, the heating configuration is used in the vehicle in the winter period, or anyway at lower operating temperatures. Conversely, the cooling configuration is used in the vehicle in the summer period, or anyway at higher operating temperatures.

Preferably, thermal regulation circuit 14 comprises a thermal stabilization tract 38 in thermal exchange relation with a radiator 40. For example, radiator 40 may be the radiator of the vehicle on which system 10 is to be installed.

In particular, in the heating configuration shown in FIG. 2 valve assembly 36 defines in thermal regulation circuit 14 a further closed cooling path, drawn with a bolder line and designated as A', for the liquid. The further closed cooling path A' is defined by connecting together cooling tract 34 and thermal stabilization tract 38. In the embodiment illustrated herein, in such heating configuration valve assembly 36 simultaneously defines the closed heating path A associated with battery 12 and the further closed cooling path A' associated with radiator 40, such closed paths A and A' being separate from each other.

In particular, in the cooling configuration shown in FIG. 3 valve assembly 36 defines in thermal regulation circuit 14 a further closed heating path, drawn with a bolder line and designated as B', for the liquid. The further closed heating path B' is defined by connecting together heating tract 32 and thermal stabilization tract 38. In the embodiment illustrated herein, in such cooling configuration valve assembly 36 simultaneously defines the closed cooling path B associated with battery 12 and the further closed heating path B' associated with radiator 40, such closed paths B and B' being separate from each other.

Preferably, thermal regulation circuit 14 comprises an interior heating tract 42 in thermal exchange relation with an air conditioning apparatus 44. In particular, apparatus 44 may be the system for conditioning the air in the interior or cabin of vehicle 10 whereon the system is to be installed.

Said apparatus 44 may be any type of HVAC (Heating, Ventilation and Air Conditioning) system.

In the embodiment illustrated herein, interior heating tract 42 is configured to be connected in parallel with operative tract 16, in particular when valve assembly 36 is in the heating configuration.

In the embodiment illustrated herein, system 10 further comprises a heating pumping device 46 configured to induce a forced circulation of liquid in the closed heating path when valve assembly 36 is in the heating configuration. In particular, heating pumping device 46 is situated in heating tract 32.

In the embodiment illustrated herein, system 10 further comprises a cooling pumping device 48 configured to induce a forced circulation of liquid in the closed cooling path when valve assembly 36 is in the cooling configuration. In particular, cooling pumping device 48 is situated in cooling tract 34.

Preferably, valve assembly 36 comprises a heating valve 50, a cooling valve 52 and a return switching valve 54. Heating valve 50 is situated between heating tract 32 and operative tract 16. Cooling valve 52 is situated between cooling tract 34 and operative tract 16. Return switching valve 54 is situated downstream of operative tract 16 and upstream of heating tract 32 and of cooling tract 34.

In the embodiment illustrated herein, heating valve 50 is also a switching valve and is situated downstream of heating tract 32 and upstream of operative tract 16 and of thermal stabilization tract 38.

In the embodiment illustrated herein, cooling valve 52 is also a switching valve and is situated downstream of cooling tract 34 and upstream of operative tract 16 and of thermal stabilization tract 38.

In particular, in the heating configuration of valve assembly 36 shown in FIG. 2:
  heating valve 50 allows the flow of liquid between heating tract 32 and operative tract 16, while preferably preventing the flow of liquid between heating tract 32 and thermal stabilization tract 38;
  cooling valve 52 prevents the flow of liquid between cooling tract 34 and operative tract 16, while preferably allowing the flow of liquid between cooling tract 34 and thermal stabilization tract 38; and
  return switching valve 54 selectively allows the flow of liquid between operative tract 16 and heating tract 32, thus bypassing cooling tract 34.

In particular, in the cooling configuration of valve assembly 36 shown in FIG. 3:

heating valve 50 prevents the flow of liquid between heating tract 32 and operative tract 16, while preferably allowing the flow of liquid between heating tract 32 and thermal stabilization tract 38;

cooling valve 52 allows the flow of liquid between cooling tract 34 and operative tract 16, while preferably preventing the flow of liquid between cooling tract 34 and thermal stabilization tract 38;

return switching valve 54 selectively allows the flow of liquid between operative tract 16 and cooling tract 34, thus bypassing heating tract 32.

In the embodiment illustrated herein, valve assembly 36 further comprises an intermediate valve arrangement configured for controlling the flow towards interior heating tract 42 and operative tract 16 in the heating configuration and, respectively, in the cooling configuration.

In particular, the intermediate valve arrangement comprises a first intermediate valve 56 situated downstream of heating tract 32 and of heating valve 50. Also, the first intermediate valve 56 is situated upstream of interior heating tract 42 and of operative tract 16, which are connected in parallel with each other. The first intermediate valve 56 is configured for controlling, in the heating configuration, the flow of fluid coming from heating tract and directed towards interior heating tract 42 and operative tract 16. Preferably, the first intermediate valve is a flow control valve (e.g. a proportional valve) configured for distributing, in the heating configuration, the flow of liquid between interior heating tract 42 and operative tract 16 (e.g. only allowing the flow of liquid into either one of interior heating tract 42 and operative tract 16 and, respectively, distributing a part of the flow to interior heating tract 42 and the other part of the flow to operative tract 16). Conversely, in the cooling configuration the first intermediate valve 56 inhibits the flow of liquid coming from cooling tract 34 towards interior heating tract 42.

In particular, the intermediate valve arrangement comprises a second intermediate valve 58 situated downstream of cooling tract 34 and of cooling valve 50. Also, the second intermediate valve 58 is connected between interior heating tract 42 and operative tract 16, which are connected in parallel with each other. The second intermediate valve 58 is configured for controlling, in the cooling configuration, the flow of fluid coming from cooling tract 50 and directed towards interior heating tract 42 and operative tract 16. Preferably, in the cooling configuration the second intermediate valve 58 is a switching valve that selectively puts in communication cooling tract 34 and operative tract 16, preventing the flow of liquid through interior heating tract 42. Conversely, in the heating configuration, downstream of cooling valve 52, the second intermediate valve 58 selectively prevents the communication between cooling tract 34 and operative tract 16.

In the embodiment illustrated herein, valve assembly 36 further comprises a pair of recirculation valves 60, 62, e.g. a pair of switching valves, and a bypass valve 64, e.g. a shut-off valve, configured for connecting thermal stabilization tract 38 to heating tract 32 and, respectively, to cooling tract 34.

In the heating configuration the following occurs:
the first recirculation valve 60 sequentially puts in mutual liquid communication cooling tract 34 (downstream of cooling valve 52) and thermal stabilization tract 38,
the second recirculation valve 62 sequentially puts in mutual liquid communication the output tract of return valve 54 and heating tract 32, and
bypass valve 64 sequentially puts in mutual liquid communication the thermal stabilization tract 38 (upstream of recirculation valve 62) and cooling tract 34.

In the cooling configuration the following occurs:
the first recirculation valve 60 sequentially puts in mutual liquid communication thermal stabilization tract 38 and heating tract 32,
the second recirculation valve 62 sequentially puts in mutual liquid communication heating tract 32 (downstream of heating valve 50) and the thermal stabilization tract 38,
bypass valve 64 prevents the liquid communication between thermal stabilization tract 38 (downstream of recirculation valve 62) and cooling tract 34.

Of course, without prejudice to the principle of the invention, the embodiments and the implementation details may be extensively varied from those described and illustrated herein by way of non-limiting example, without however departing from the scope of the invention as set out in the appended claims.

The invention claimed is:

1. A system for controlling temperature of at least one battery in a vehicle; said system comprising:
   at least one battery configured for outputting electric power;
   a thermal regulation circuit configured for being run through by a liquid and comprising an operative tract in thermal exchange relation with said at least one battery, so as to control the temperature thereof;
   a refrigeration circuit configured for being run through by a fluid that is subjectable to a refrigeration cycle in a non-reversible manner; said refrigeration circuit comprising:
   a condenser in thermal exchange relation with a heating tract of said thermal regulation circuit; and
   an evaporator in thermal exchange relation with a cooling tract of said thermal regulation circuit; and
   a valve assembly associated with the thermal regulation circuit and configured for selectively taking:
   a heating configuration, in which said valve assembly defines, in the thermal regulation circuit, a closed heating path for the liquid between the operative tract and the heating tract;
   a cooling configuration, in which said valve assembly defines, in the thermal regulation circuit, a closed cooling path for the liquid between the operative tract and the cooling tract;
   wherein said thermal regulation circuit comprises a heating tract in thermal exchange relation with an air conditioning apparatus.

2. The system according to claim 1, wherein said thermal regulation circuit comprises a thermal stabilization tract in thermal exchange relation with a radiator.

3. The system according to claim 1, wherein said heating tract is configured to be connected in parallel with said operative tract when said valve assembly is in the heating configuration.

4. The system according to claim 1, further comprising at least one pumping device configured to induce a forced circulation of said liquid through said closed heating path when said valve assembly is in the heating configuration and, induce a forced circulation of said liquid through said closed cooling path in the cooling configuration.

5. The system according to claim 4, wherein said at least one pumping device comprises a heating pumping device configured to induce a forced circulation through said closed heating path.

6. The system according to claim 5, wherein said heating pumping device is situated in said heating tract.

7. The system according to claim 4, wherein said at least one pumping device comprises a cooling pumping device configured to induce a forced circulation through said closed cooling path.

8. The system according to claim 7, wherein said cooling pumping device is situated in said cooling tract.

9. The system according to claim 1, wherein said valve assembly comprises:
   a heating valve situated between the heating tract and the operative tract;
   a cooling valve situated between the cooling tract and the operative tract; and
   a return switching valve situated downstream of the operative tract and upstream of the heating tract and of the cooling tract.

10. The system according to claim 9, wherein in the heating configuration of the valve assembly:
    the heating valve allows flow of liquid between said heating tract and said operative tract;
    the cooling valve prevents the flow of liquid between said cooling tract and said operative tract;
    the return switching valve selectively allows the flow of liquid between said operative tract and said heating tract.

11. The system according to claim 9, wherein in the cooling configuration of the valve assembly:
    the heating valve prevents the flow of liquid between said heating tract and said operative, and
    the cooling valve allows the flow of liquid between said cooling tract and said operative tract;
    the return switching valve selectively allows the flow of liquid between said operative tract and said cooling tract.

12. The system according to claim 9, wherein said thermal regulation circuit comprises a thermal stabilization tract in thermal exchange relation with a radiator, wherein said heating valve is a switching valve situated downstream of the heating tract and upstream of the operative tract and of the thermal stabilization tract.

13. The system according to claim 9, wherein said thermal regulation circuit comprises a thermal stabilization tract in thermal exchange relation with a radiator, wherein said cooling valve is a switching valve situated downstream of the cooling tract and upstream of the operative tract and of the thermal stabilization tract.

14. A system for controlling temperature of at least one battery in a vehicle; said system comprising:
    at least one battery configured for outputting electric power;
    a thermal regulation circuit configured for being run through by a liquid and comprising an operative tract in thermal exchange relation with said at least one battery, so as to control the temperature thereof;
    a refrigeration circuit configured for being run through by a fluid that is subjectable to a refrigeration cycle in a non-reversible manner; said refrigeration circuit comprising:
      a condenser in thermal exchange relation with a heating tract of said thermal regulation circuit; and
      an evaporator in thermal exchange relation with a cooling tract of said thermal regulation circuit; and
    a valve assembly associated with the thermal regulation circuit and configured for selectively taking:
      a heating configuration, in which said valve assembly defines, in the thermal regulation circuit, a closed heating path for the liquid between the operative tract and the heating tract;
      a cooling configuration, in which said valve assembly defines, in the thermal regulation circuit, a closed cooling path for the liquid between the operative tract and the cooling tract;
    wherein said thermal regulation circuit comprises a thermal stabilization tract in thermal exchange relation with a radiator; and
    wherein in the heating configuration said valve assembly defines, in the thermal regulation circuit, a further closed cooling path for said liquid, connecting together said cooling tract and said thermal stabilization tract.

15. A system for controlling temperature of at least one battery in a vehicle; said system comprising:
    at least one battery configured for outputting electric power;
    a thermal regulation circuit configured for being run through by a liquid and comprising an operative tract in thermal exchange relation with said at least one battery, so as to control the temperature thereof;
    a refrigeration circuit configured for being run through by a fluid that is subjectable to a refrigeration cycle in a non-reversible manner; said refrigeration circuit comprising:
      a condenser in thermal exchange relation with a heating tract of said thermal regulation circuit; and
      an evaporator in thermal exchange relation with a cooling tract of said thermal regulation circuit; and
    a valve assembly associated with the thermal regulation circuit and configured for selectively taking:
      a heating configuration, in which said valve assembly defines, in the thermal regulation circuit, a closed heating path for the liquid between the operative tract and the heating tract;
      a cooling configuration, in which said valve assembly defines, in the thermal regulation circuit, a closed cooling path for the liquid between the operative tract and the cooling tract;
    wherein said thermal regulation circuit comprises a thermal stabilization tract in thermal exchange relation with a radiator; and
    wherein in the cooling configuration said valve assembly defines, in the thermal regulation circuit, a further closed heating path for said liquid, connecting together said heating tract and said thermal stabilization tract.

16. A system for controlling temperature of at least one battery in a vehicle; said system comprising:
    at least one battery configured for outputting electric power;
    a thermal regulation circuit configured for being run through by a liquid and comprising an operative tract in thermal exchange relation with said at least one battery, so as to control the temperature thereof;
    a refrigeration circuit configured for being run through by a fluid that is subjectable to a refrigeration cycle in a non-reversible manner; said refrigeration circuit comprising:
      a condenser in thermal exchange relation with a heating tract of said thermal regulation circuit; and
      an evaporator in thermal exchange relation with a cooling tract of said thermal regulation circuit; and
    a valve assembly associated with the thermal regulation circuit and configured for selectively taking:
      a heating configuration, in which said valve assembly defines, in the thermal regulation circuit, a closed heating path for the liquid between the operative tract and the heating tract;

a cooling configuration, in which said valve assembly defines, in the thermal regulation circuit, a closed cooling path for the liquid between the operative tract and the cooling tract;

wherein said valve assembly comprises:

a heating valve situated between the heating tract and the operative tract;

a cooling valve situated between the cooling tract and the operative tract; and a return switching valve situated downstream of the operative tract and upstream of the heating tract and of the cooling tract;

wherein said thermal regulation circuit comprises a thermal stabilization tract in thermal exchange relation with a radiator, wherein said heating valve is a switching valve situated downstream of the heating tract and upstream of the operative tract and of the thermal stabilization tract; and wherein in the cooling configuration of the valve assembly the heating valve allows the flow of liquid between said heating tract and said thermal stabilization tract.

17. A system for controlling temperature of at least one battery in a vehicle; said system comprising:

at least one battery configured for outputting electric power;

a thermal regulation circuit configured for being run through by a liquid and comprising an operative tract in thermal exchange relation with said at least one battery, so as to control the temperature thereof;

a refrigeration circuit configured for being run through by a fluid that is subjectable to a refrigeration cycle in a non-reversible manner; said refrigeration circuit comprising:

a condenser in thermal exchange relation with a heating tract of said thermal regulation circuit; and an evaporator in thermal exchange relation with a cooling tract of said thermal regulation circuit; and a valve assembly associated with the thermal regulation circuit and configured for selectively taking:

a heating configuration, in which said valve assembly defines, in the thermal regulation circuit, a closed heating path for the liquid between the operative tract and the heating tract;

a cooling configuration, in which said valve assembly defines, in the thermal regulation circuit, a closed cooling path for the liquid between the operative tract and the cooling tract;

wherein said valve assembly comprises:

a heating valve situated between the heating tract and the operative tract;

a cooling valve situated between the cooling tract and the operative tract; and a return switching valve situated downstream of the operative tract and upstream of the heating tract and of the cooling tract;

wherein said thermal regulation circuit comprises a thermal stabilization tract in thermal exchange relation with a radiator, wherein said cooling valve is a switching valve situated downstream of the cooling tract and upstream of the operative tract and of the thermal stabilization tract; and wherein in the heating configuration of the valve assembly the cooling valve allows the flow of liquid between said cooling tract and said thermal stabilization tract.

* * * * *